United States Patent [19]

Candau et al.

[11] Patent Number: 4,876,036

[45] Date of Patent: Oct. 24, 1989

[54] PROCESS FOR THE EXTRACTION OF CATIONS AND APPLICATION THEREOF TO THE TREATMENT OF AQUEOUS EFFLUENTS

[75] Inventors: Sauveur Candau; Maurice Leroy; Jean-Pierre Brunette, all of Strasbourg; Paul Mallo, Rueil Malmaison; Jean-Francois Loret, Strasbourg; Gilles Waton, Strasbourg, all of France

[73] Assignee: Societe Chimique des Charbonnages S.A., France

[21] Appl. No.: 134,845

[22] Filed: Dec. 18, 1987

[30] Foreign Application Priority Data

Dec. 19, 1986 [FR] France ............................ 86-17791

[51] Int. Cl.$^4$ ..................... C21F 9/08; C21F 9/16; C01G 56/00; C01G 57/00

[52] U.S. Cl. ..................... 252/637; 252/628; 252/632; 210/681; 210/682; 210/688; 210/751; 210/685; 423/2; 423/3; 423/7; 423/24; 423/63; 423/100; 423/157; 423/181; 423/658.5

[58] Field of Search .............. 252/631, 628, 632, 626; 210/681, 682, 660, 661, 664, 666, 670, 685, 751, 710, 733; 423/6, 7, 2, 3, 24, 63, 100, 157, 181, 658.5

[56] References Cited

U.S. PATENT DOCUMENTS

| | | | |
|---|---|---|---|
| 3,216,786 | 11/1965 | Corte et al. | 210/682 |
| 3,995,009 | 11/1976 | Notz | 423/7 |
| 4,070,438 | 1/1978 | Notz et al. | 423/7 |
| 4,156,658 | 5/1979 | Mercer, Jr. et al. | 252/628 |
| 4,235,737 | 11/1980 | Pritchard et al. | 210/682 |
| 4,511,677 | 4/1985 | Horton et al. | 423/7 |
| 4,530,723 | 7/1985 | Smeltzer et al. | 252/628 |
| 4,606,894 | 8/1986 | Kunin et al. | 423/7 |
| 4,622,366 | 11/1986 | Sugo et al. | 204/157.64 |
| 4,671,898 | 6/1987 | Hultgren | 252/631 |
| 4,683,124 | 7/1987 | Muscatello et al. | 423/7 |
| 4,705,672 | 11/1987 | McCurdy et al. | 423/3 |
| 4,715,992 | 12/1987 | Snyder et al. | 252/628 |
| 4,720,422 | 1/1988 | Higuchi et al. | 428/252 |
| 4,732,705 | 3/1988 | Laske et al. | 252/628 |

FOREIGN PATENT DOCUMENTS 2068158 7/1971 France .
2553678 4/1985 France .

Primary Examiner—Howard J. Locker
Attorney, Agent, or Firm—Finnegan, Henderson, Farabow, Garrett & Dunner

[57] ABSTRACT

A process for the extraction of cations from an aqueous effluent. An effective quantity of at least one polymer or copolymer, which is physically or chemically cross-linked, is introduced into the aqueous effluent. The polymer or copolymer is based on one or more units selected from salified acrylic acid, quarternized acrylic acid, and a copolymer comprising from 40 to 60 mole % of acrylic acid and from 60 to 40 mole % of at least one dialkylaminoalkyl acrylate in which each alkyl group contains from 1 to 4 carbon atoms. This process is used to treat aqueous effluents.

16 Claims, No Drawings

PROCESS FOR THE EXTRACTION OF CATIONS AND APPLICATION THEREOF TO THE TREATMENT OF AQUEOUS EFFLUENTS

BACKGROUND OF THE INVENTION

The present invention relates to the field of treating aqueous effluents containing cations.

The extraction of some metals from aqueous effluents using ion exchange resins is already known. For example, French Pat. No. A-2,068,158 describes the extraction of strontium-90 from an irradiated effluent by making this effluent sufficiently alkaline to give it a pH of at least 10 and then by passing it through a carboxylic acid cation exchange resin.

U.S. Pat. No. 4,156,658 discloses the binding of radioactive ions, such as strontium-90 and cesium-137, in the soil by first injecting a chemical composition containing the radioactive ions into the soil. The chemical composition contains sodium acrylate, acrylamide and N,N'-methylene-bisacrylamide, which are capable of being polymerized to form a gelled structure. An initiator and a catalyst is then injected into the soil to accomplish the polymerization and the formation of an ion exchange gel in the soil so that the soil and the ions are physically bound by the gelled structure and the ions are chemically bound by the ion exchange properties of the gel.

U.S. Pat. No. 4,235,737 discloses the treatment of an aqueous or organic liquid containing dissolved or suspended radioactive particles and having a pH greater that 5.5. In this treatment an effective amount of an absorber consisting of an alkali metal salt of a polyacrylonitrile grafted onto starch is added to the liquid. The radioactive element that is particularly relevant to this process is iodine and the quantity of polymer employed for this treatment preferably varies between 1 and 2,000 times the weight of the radioactive liquid.

Moreover, U.S. Pat. No. 3,995,009 describes a process of ion exchange by bringing a cationic exchange resin in the ammonium form, such as, for example, an acrylic-divinylbenzene copolymer containing a carboxylic acid functional group, into contact with an aqueous solution of uranyl fluoride. U.S. Pat. No. 3,216,786 describes a process for the recovery of heavy metals from a solution having a pH of at least 4 and containing compounds in which metals are present in the form of cations. In this process, the solution is first brought into contact with a slightly acid ion exchange resin that is a cross-linked matrix to which a carboxylic acid is bound. The matrix is produced by copolymerizing from 0.5% to 50% by weight of a polyethylenically unsaturated (cross-linked) monomer and from 50 to 99.5% by weight of a monoethylenically unsaturated monomer (for example acrylic acid or methacrylic acid) in an organic solvent and by removing the occluded organic solvent from the crosslinked copolymer to obtain a spongy structure.

The ion exchange resin is regenerated by washing the resin with an acid to remove the absorbed heavy metal.

Finally, French Pat. No. A-2,553,678 described N-alkyl- or N-alkylene-substituted acrylamide or methacrylamide polymers and copolymers of the (meth)acrylamides containing up to 30% by weight of at least one ionic comonomer such as especially acrylic acid, methacrylic acid and their salts. These (co)polymers, prepared, for example, in an inverse phase suspension, have a water absorption capacity that varies according to temperature so that, once heated, they undergo a contraction even in the presence of a large excess of water to release the water once absorbed. Their water absorption capacity is not substantially affected by the presence of an inorganic salt in the water. When an aqueous solution contains a low molecular weight solute such as, for example, an inorganic salt, it can be absorbed by this polymer while it still contains the solute.

Thus, it emerges from this review of the state of the art that acrylic polymers in the form of exchange resins or in underground extraction have been proposed for treatment of aqueous effluents containing especially radioactive ions. In the case of U.S. Pat. No. 4,235,737, the gravimetric quantity of the polymer employed, which is always greater than the quantity of the liquid to be treated, restricts the application of the process to effluents of particularly high value, because of the high cost of the polymer.

An ion exchange resin is an unswelling solid compound which retains its physical structure during the ion exchange process. In contrast, acrylic polymers having a certain water absorption capacity are capable of passing from a powdery state to a gel state, i.e. of changing their physical structure.

SUMMARY OF THE INVENTION

The present invention solves the problem of extracting cations from aqueous effluents containing them. The present process efficiently and economically achieves this extraction irrespective of the concentration of cations of the effluents, by avoiding the use of ion exchange resins that are expensive and provide inadequate efficiency. Economic extraction means that the process must be suitable, because of the use of very small proportions relative to the aqueous effluent to be treated, for use in very varied fields in which the treatment of these effluents for the removal of undesirable cations or alternatively the control of the content of some useful cations in these effluents is sought.

The present invention provides a process for the extraction of cations from an aqueous effluent that is both efficient and economical. The present process for the extraction of cations from an aqueous effluent introduces into an aqueous effluent an effective quantity of at least one polymer or copolymer. The polymer or copolymer is physically or chemically crosslinked and is based on one or more units selected from the group consisting of salified acrylic acid, quaternized acrylic acid, and a copolymer comprising from 40 to 60 mole % of acrylic acid and from 60 to 40 mole % of at least one dialkylaminoalkyl acrylate in which each alkyl group contains from 1 to 4 carbon atoms. The acrylic acid and the dialkylminoalkyl acrylate in the copolymer can be at least partially salified or quaternized.

As used herein, the term salified or quaternized acrylic acid means that the acrylic acid is at least partially replaced by at least one of its ammonium or alkali metal or alkaline earth metal salts. The term salified or quaternized dialkylmainoalkyl acrylate means that the dialkylaminoalkyl acrylate may be partially replaced by at least one of its salts, such as its quaternary ammonium salt. Not all of the acrylic acid or dialkyl aminoacrylate need be salified or quaternized.

The above and other features and advantages of the present invention will be made more apparent from the following description of the preferred embodiment.

DETAILED DESCRIPTION OF THE PREFERRED EMBODIMENT

The copolymer employed within the scope of the present invention is preferably based on at least approximately 50 mole % of alkali metal acrylate or alkaline earth metal acrylate or ammonium acrylate and not more than approximately 50 mole % of acrylic acid.

When it is not spontaneously physically crosslinked by the choice of a suitable manufacturing process, the polymer or the copolymer employed within the scope of the present invention may additionally comprise an effective quantity of at least one chemical crosslinking agent. According to the manufacturing process adopted or the polymer, this quantity is less than approximately 5% by weight and is preferably between 0.04% and 3% by weight relative to the sum of the constituent monomers.

Examples of crosslinking agents that can be employed within the scope of the present invention include:

(1) compounds containing at least two double bonds which can be polymerized;

(2) compounds containing at least one double bond, which bond can be polymerized, and at least one functional group which is reactive with at least one of the constituent monomers of the polymer; and (3) compounds containing at least two functional groups which are reactive with at least one of the constituent monomers of the polymer.

Examples for the first listed crosslinking agent containing at least two double bonds that can be polymerized are:

(a) di- or polyvinyl compounds such as divinylbenzene, divinyltoluene, divinylxylene, divinyl ether, divinyl ketone and trivinylbenzene, (b) di- or polyesters of unsaturated mono- or polycarboxylic acids with polyhydric alsohols, such as esters of di or tri(methyl)acrylic acids with polyhydric alcohols (such as ethylene glycol, trimethylol propane, glycerol, polyoxyethylene glycols, polyoxypropylene glycols, and the like), unsaturated polyesters (which can be obtained by reacting any one of the polyhydric alcohols mentioned above with an unsaturated acid such as maleic aicd), and di- or tri-(meth)acrylic acid esters which can be obtained by reacting a polyepoxide with (meth)acrylic acid, (c) bis(meth)acrylamides such as N,N'-methylenebisacrylamide and glyoxalbisacrylamide, (d) carbamyl esters which can be obtained by reacting polyisocyanates (such as toluene diisocyanate, hexamethylene dissocyanate, 4,4'-diphenylmethane diisocyanate and prepolymers containing an NCO group obtained by reacting such a diisocyanate with compounds containing active hydrogen atoms) with monomers containing hydroxyl groups. Such carbamyl esters are especially those of di(meth)acrylic acids which can be obtaind by reacting the diisocyanates mentioned above with hydroxyethyl (meth)acrylate, (e) di- or poly(meth)allyl ethers of polyhydric alcohols such as alkylene glycols, glycerol, polyalkylate glycols, polyoxyalkylene polyols and carbohyrates), such as diallyl ether of polyethylene glycol, allylstarch and allylcellulose, (f) di- or polyallyl esters of polycarboxylic acids, such as diallyl phthalate, diallyl adipate and the like, and (g) esters of unsaturated mono- or polycaboxylic acids with mono(meth)allyl ethers of polyhydric alcohols, such as the ester of (meth)acrylic acid with polyethylene glycol monoally ether.

Crosslinking agents of the second type mentioned above that contain at least one double bond which can be polymerized and at least one functional group reactive with at least one of the monomers include ethylenically unsaturated compounds containing at least one group which is reacted with caboxyl, carboxylic anyhydride, hydroxyl, amine or amide groups. Examples of these compounds are N-methylol(meth)acrylamide, glycidyl (meth)acrylate and the like.

The crosslinking agents of the third type mentioned above, containing at least two functional groups reactive with at least one of the constituent monomers of the polymer, are: water-soluble compounds derived from diglycidyl ether such as for example, (poly)ethylene glycol diglycidyl ether, (poly)propylene glycol diglycidyl ether and (poly)glycerol diglycidyl ether; haloepoxidized compounds such as, for example, epichlorhydrin and 1'-methylepichlorhydrin; and isocyanate compounds such as especially hexamethylene diisocyanate.

The polymers and the copolymers used in the present invention may be obtained by polymerization in the presence of at least one free radical generator, either in an aqueous solution or in an inverse emulsion or in suspension, in the presence of at least one emulsifying agent. These polymerization techniques are well known to the person skilled in the art. Different free radical generating means may be employed, especially microwaves, beta, gamma or ultraviolet radiations or alternatively chemical initiators. In the latter case, the polymerization initiator may be especially selected from persulfates, peroxides, hydroperoxides and diazo compounds. When a persulfate is chosen as the initiator, it may be used in combination with a reducing agent selected from polyhydrophenols, sodium sulfite bisulfite, dimethylaminopropionitrile, diazomercaptans, ferricyanides, and ferrosulfate. The initiator and, if required, the reducing agent, may be used at a rate of approximately 0.05 to 2% each by weight relative to the sum of the constituent monomers of the polymer. The polymers or the copolymers obtained according to these processes are advantageously in the form of particles having an average size of approximately between 1 and 1,000 $\mu$m.

Examples of processes for the production, with or without chemical crosslinking, of the polymers and the copolymers that can be used in the present invention may be found especially in U.S. Pat. Nos. 3,926,891, 4,351,922, 4,062,817, 4,093,776, 4,507,438, and 4,541,871, European Patent A-188,963, and European Patent Application No. 87,410,825.2. The contents of these patents and patent applications are incorporated into the present specification by reference.

It is important to note that the polymer of copolymer that can be used in the invention is efficient for the extraction of cations from an aqueous effluent in a very small quantity relative to the efficient. Preferably, the polymer or the copolymer is used in a quantity of between approximately 0.02 and 20 g per approximately 1 liter of the aqueous effluent. Within the meaning of the present invention, the term aqueous effluent means aqueous solutions as well as two-phase mixures comprising an aqueous phase.

The cations subjected to extraction by the process according to the invention may be of extremely diverse nature. They may especially be selected from proton, deuteron, tritium ion, ammonium ion, quaternary ammonium ions and cations of the metals of groups IA, IIA, IVA, VA, VIII, IB, IIB and VB of the Periodic Table as well as lanthanides and actinide. Examples of such metal cations are: monovalent cations of sodium, potassium, caesium and silver; divalent actions of magnesium calcium, strontium, barium, radium iron, cobalt, zinc, copper, nickel, cadmium, lead and mercury; trivalent cations of europium, bismuth and lanthanum; tetravelent cations of vanadium, cerium and thorium; and hexavalent cations of uranium. In the aqueous effluents in which they are present, the cations to be extracted may be combined with the most diverse anions, such as especially halide, nitrate, sulfate, oxalate, carbonate, hydrogencarbonate, acetate, and the like or alternatively with complexing ligands.

The pH of the aqueous effluent subjected to the cation extraction process according to the invention is advantageously between approximately 2 and 5. It is important to note that, in some cases, the pH of the aqueous effluent after extraction may be up to 3 units higher than the initial pH of the aqueous effluent.

The extraction process according to the invention may be performed in one or several stages. When the process is performed in several stages, the portion of the aqueous effluent that has not been absorbed by the polymer may be separated from the swollen polymer and then transferred into a vessel into which an effective quantity of fresh polymer is again introduced, and so on. Thus, by virtue of the present invention, by repeating this operation the number of times required, it is possible either to remove almost completely the undesirable cations from the aqueous effluent or to control the content of some useful cations in this effluent.

The process of the present invention can be used to treat aqueous effluents. For example, the cation extraction process of the present invention can be used to treat spring water, demineralize water, decontaminate aqueous effluents containing radioactive wastes (such as those which may originate from nuclear power stations), treat waste waters or treat industrial aqueous effluents containing dissolved metal residues (such as catalytic residues originating from olefin polymerization plants). In the case of the treatment of aqueous effluents containing radioactive wastes, the advantage of the present invention lies especially in the fact that the radioactive metals are concentrated in a small volume and in a swollen polymer form which is compatible with embedding, for example in concrete.

In some cases, especially when the metal cations are cations of precious metals such as gold, silver or platinum, or alternatively cations of rare metals such as vanadium, iridium or uranium, the metal trapped in the gel may be recovered, especially by burning the gel.

The present process for the treatment of the aqueous effluents obtains the advantage of being efficient, by bringing the effluent into contact with a polymer or a copolymer as specified above. As a result, the process is effective even when the concentration of cations in the aqueous effluent is extremely low. Thus, it will be possible to remove up to more than 80% of some cations when their concentration in the effluent is not more than 10 ppm. Moreover, the treatment process according to the invention may be performed at any temperature between approximately 5° C. and 80° C.

The examples below are given by way of illustration, without implied limitation, of the present invention.

EXAMPLES 1 TO 3

A mass $m_i$ (expressed as grams) of the polymer is stirred, at a temperature of 18° C., for approximately 15 minutes, with 50 ml of an aqueous solution of chlorides containing metal cations $M^{n+}$ (n being the valency of the metal M) at concentrations $C_i$ (expressed as ppm). The polymer employed is a physically crosslinked copolymer containing 80 mole % of units derived from sodium acrylate and 20 mole % of units derived from acrylic acid.

The polymer swells by fixing in part the metal ions. The swelling of the polymer is determined by weighing the gel after filtering (final mass $m_f$ expressed as grams). The concentrations of metal cations in the supernatant solution are then determined by atomic absorption or emission spectometry depending on the element, so as to calculate the proportion (expressed as %) of cations bound to the gel. The results are given in Table I below.

EXAMPLES 4 TO 8

The operating procedure in Examples 1 to 3 is repeated except that the aqueous solution subject to extraction is a solution of nitrates. The results are given in Table I below.

EXAMPLE 9

A mass $m_i=1$ gram of polymer is placed, at a temperature of 20° C., in a beaker containing 500 ml of a nutrient solution containing $M^{n+}$ cations at concentrations $C_i$ (expressed as ppm). The polymer employed is a product marketed by NORSOLOR under the name AQUA-KEEP X 5. The whole mixture is kept stirred for 2 hours and then filtered on a metal cloth having a pore size of 100 mesh. The polymer swells by partially binding the ions. The swelling of the polymer is determined by weighing the gel after filtering (final mass $m_f$ expressed as grams). The concentrations of cations in the eluate are determined by flame spectrophotometry (Mg and K) and by the Nessler technique (NH4), so as to calculate the proportion (expressed as %) of cations bond to the gel. The results are given in the table below.

TABLE I

| Example | $M^{n+}$ | $C_i$ | $m_i$ | $m_f$ | % |
|---|---|---|---|---|---|
| 1 | $Sr^{++}$ | 1000 | 0.20 | 15.7 | 91 |
|  | $Cs^+$ | 1250 |  |  | 46 |
| 2 | $Sr^{++}$ | 500 | 0.1 | 12.2 | 97 |
| 3 | $Sr^{++}$ | 1000 | 0.1 | 0.46 | 60 |
| 4 | $Cs^+$ | 8.8 | 0.0024 | 1.8 | 37 |
|  | $Ag^+$ | 8.2 |  |  | 89 |
| 5 | $Ca^{2+}$ | 5.5 | 0.0021 | 0.08 | 30 |
|  | $Co^{2+}$ | 9.0 |  |  | 42 |
|  | $Sr^{2+}$ | 13.2 |  |  | 35 |
| 6 | $Cs^+$ | 8.9 | 0.02 | 14.5 | 82 |
|  | $Ca^{2+}$ | 3.4 |  |  | 84 |
|  | $Co^{2+}$ | 5.1 |  |  | 85 |
|  | $Sr^{2+}$ | 7.6 |  |  | 94 |
|  | $Ag^+$ | 8.7 |  |  | 93 |
| 7 | $Co^{2+}$ | 8.3 | 0.002 | 2.24 | 82 |
| 8 | $Mg^{++}$ | 36 | 1 | 140 | 92 |
|  | $K^+$ | 414 |  |  | 68 |
|  | $NH_4^+$ | 186 |  |  | 61 |

EXAMPLE 10

An aqueous solution of vanadyl sulfate pentahydrate $VOSO_4, 5H_2O$ having a blue color is place, at a temperature of 20° C., in a beaker. The polymer employed in Example 11 is then added in small amounts, while stirring for a few minutes. A gradual discoloration of the solution is observed while the polymer swells in the form of a blue colored gel.

EXAMPLE 11

An aqueous solution of uranyl nitrate hexahydrate $UO_2(NO_3)_2,6H_2O$ having a yellow color is placed, at a temperature of 20° C., in a beaker. The same polymer as in the preceding example is then added, while stirring for a few minutes. A gradual discoloration of the solution is observed, while the polymer swells in the form of a yellow colored gel.

EXAMPLES 12 TO 19

50 ml of an aqueous liquor (the pH of which is adjusted to 4 by adding nitric acid) containing 10 ppm of a metal in the form of a cation $M^{n+}$ are brought into contact with 2 mg of dry copolymer. The copolymer employed comprises x mole % of units derived from sodium acrylate, (100−x) mole % of units derived from acrylic acid and y % by weight of diethylene glycol diacrylate relative to the sum of acrylic acid and sodium acrylate.

The reagents are brought into contact for 30 min. at a temperature of 25° C., after which the solution is filtered and analyzed.

The content of metal retained by the gel (expressed as % and shown in Table II below) is calculated by the formula:

$$\% = (C_o V_o - C_f V_f)/C_o V_o$$

In this formula, $C_o$ and $V_o$ are the initial metal concentration and initial volume of the aqueous solution. $C_f$ and $V_f$ are the concentration and volume of the aqueous solution which is not trapped in the gel after contact.

Table II below shows the results obtained for different metals at different values of x and y, i.e. the extent of neutralization of acrylic acid in the copolymer and the level of crosslinking of the copolymer.

TABLE II

| Example | $M^{n+}$ | x | y | % |
|---|---|---|---|---|
| 12 | Ir | 80 | 0.5 | 90 |
| 13 | Pb | 80 | 0.5 | 80 |
| 14 | $Eu^{3+}$ | 80 | 0.2 | 99 |
| 15 | $La^{3+}$ | 80 | 0.5 | 98 |
| 16 | $Th^{4+}$ | 80 | 0.5 | 65 |
| 17 | $Eu^{3+}$ | 60 | 0.2 | 90 |
| 18 | $La^{3+}$ | 60 | 0.2 | 96 |
| 19 | $Th^{4+}$ | 60 | 0.2 | 84 |

While particular embodiments of the invention have been described, it will be understood that the invention is not so limited since many modifications and variations could be made without departing from the spirit or scope of the invention.

What is claimed is:

1. A process for the extraction of cations from an aqueous effluent containing cations comprising the step of introducing into an aqueous effluent containing cations an effective quantity of at least one polymer or copolymer being physically or chemically crosslinked and based on one or more units selected from the group consisting of salified acrylic acid, quaternized acrylic acid, and a copolymer comprising from 40 to 60 mole % of acrylic acid and from 60 to 40 mole % of at least one dialkylaminoalkyl acrylate in which each alkyl group contains from 1 to 4 carbon atoms.

2. The cation extraction process claimed in claim 1, wherein the acrylic acid in the copolymer is at least partially salified or quaternized.

3. The cation extraction process as claimed in claim 1, wherein the dialkylaminoalkyl acrylate in the copolymer is at least partially salified or quaternized.

4. The cation extraction process as claimed in claim 1, wherein the polymer or the copolymer is employed in a quantity of between 0.02 and 20 grams per liter of the aqueous effluent.

5. The cation extraction process as claimed in claim 1, wherein the cations subjected to extraction are selected from the group consisting of proton, deuteron, tritium ion, ammonium ion, quaternary ammonium ions, and cations of the metals of groups IA, IIA, IVA, VA, VIII, IB, IIB and VB of the Periodic Table as well as lanthanides and actinides.

6. The cation extraction process as claimed in claim 1, wherein the pH of the aqueous effluent subjected to extraction is between 2 and 5.

7. The cation extraction process as claimed in claim 1, wherein the polymer or the copolymer is in the form of particles having an average size of between 1 and 1,000 μm.

8. The cation extraction process as claimed in claim 1, wherein the polymer or copolymer is based on not more than 50 mole % of acrylic acid and at least 50 mole % of alkaline metal acrylate.

9. The cation extraction process as claimed in claim 1, wherein the polymer or the copolymer further comprises an effective quantity of at least one chemical crosslinking agent.

10. The cation extraction process as claimed in claim 7, wherein the quantity of the chemical crosslinking agent is 5% by weight or less relative to the sum of the constituent monomers of the polymer.

11. The cation extraction process as claimed in claim 1, wherein the concentration of cations in the effluent is not more than 10 ppm.

12. The cation extraction process as claimed in claim 1, wherein the extraction is performed at a temperature of between 5° and 80° C.

13. A process for the treatment of aqueous effluents comprising a cation extracton stage according to the process of claim 1 and an additional treatment step.

14. The treatment process as claimed in claim 13, wherein the cation extraction stage of the treatment decontaminates effluents containing radioactive wastes.

15. The treatment process as claimed in claim 14, wherein subsequent to the cation action stage the swollen polymer obtained at the end of the cation extraction stage is embedded in concrete.

16. The treatment process as claimed in claim 13, wherein subsequent to the cation extraction stage of the treatment the swollen polymer obtained at the end of the cation extraction stage is burnt to recover the metal of the cation.

* * * * *